Sept. 3, 1929.   R. R. BOWERS   1,726,535
COMBINED MOWER AND RAKE
Filed Sept. 27, 1923   2 Sheets-Sheet 1
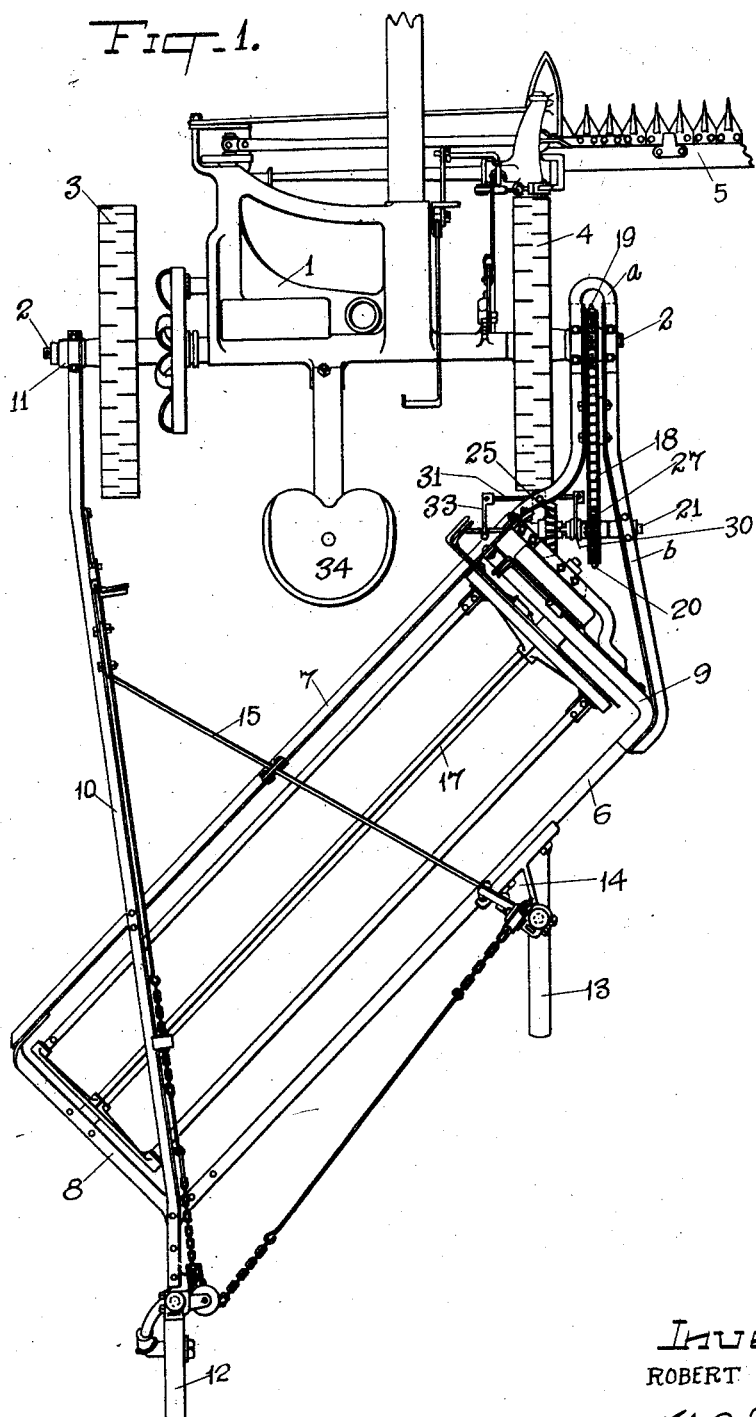
Inventor:
ROBERT R. BOWERS

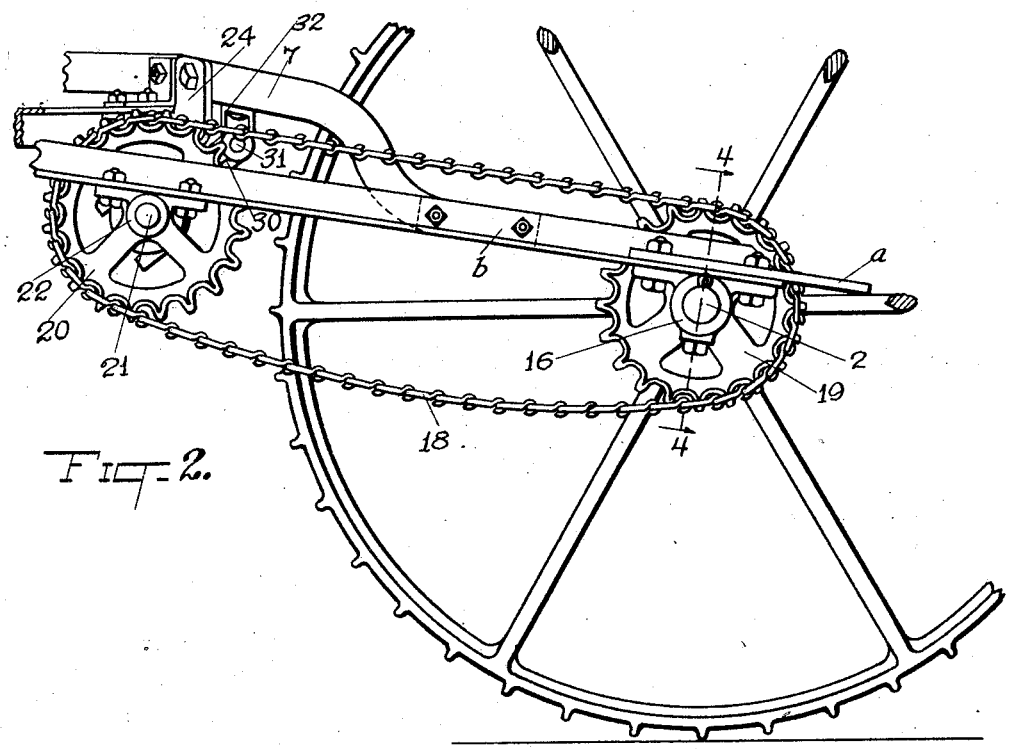
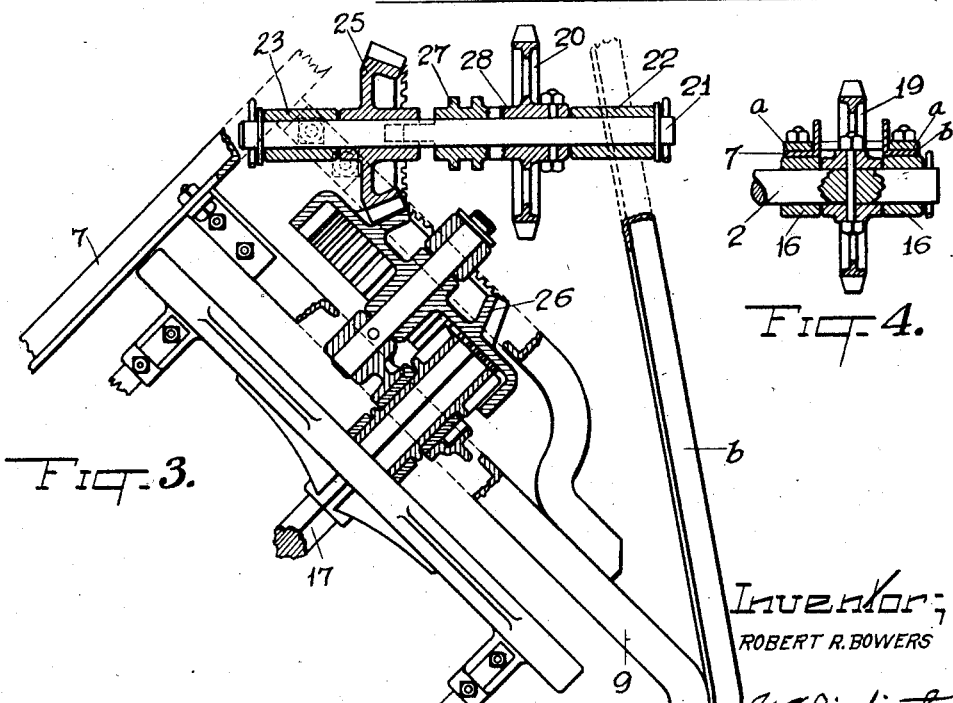

Patented Sept. 3, 1929.

1,726,535

UNITED STATES PATENT OFFICE.

ROBERT R. BOWERS, OF BRANSON, COLORADO, ASSIGNOR TO DAIN MANUFACTURING COMPANY OF IOWA, OF OTTUMWA, IOWA, A CORPORATION OF IOWA.

COMBINED MOWER AND RAKE.

Application filed September 27, 1923. Serial No. 665,158.

My invention relates to harvesting machinery and more particularly to that class in which cutting and gathering devices are jointly operated to facilitate the operation of harvesting, and the object of my invention is to combine a mower and a side delivery rake whereby the curing of the hay will be facilitated.

A further object of my invention is to so locate the rake with respect to the mower that the entire swath of cut grass or vines will be gathered by the rake and formed into a continuous windrow.

A further object of my invention is to combine a side delivery rake with a mower in such a manner as to gather grass or vines cut by the mower, on a round precedent to the round being cut, and to form thereof a continuous windrow on ground previously raked.

A further object of my invention is to combine a side delivery rake with a mower so that the labor required to operate either machine will be sufficient for both.

When grass has been cut its food quality, and consequently its market value, depends upon its proper conversion into hay by the heat of the sun, atmospheric conditions, and the dryness of the soil upon which the grass falls as it is cut by the mower. Various implements and combinations of implements have been devised to effect a perfect change from the fresh cut grass into hay possessing the greatest amount of nutritive value; this change or curing can only be secured by proper evaporation of the moisture in the cut grass and on the surface of the ground on which the hay is deposited. This evaporation in the process of making hay is rapid and to prevent uneven curing and possible sunburn the grass must be turned, so that the drying will be done evenly, and at the same time formed into a windrow on ground previously raked.

With my invention, I obtain a perfectly cured hay by combining a side delivery rake with a mower, actuated by power from the mower and operating to gather a swath precedent to the swath being cut, when the combined machines are in operation, and deposit it on a continuous windrow which is unbroken while the mower is cutting unless the clutch controlling the transmission of power from the mower to the rake is separated at the will of the operator, the action of the rake in moving the hay presenting all parts of the plants to the curative influences of sun and air, and depositing the resulting hay in a windrow on ground previously raked and sufficiently dry, the rake extending stubbleward beyond the mower a sufficient distance to completely gather the swath upon which it is operating.

Referring to the drawings in which similar numerals indicate identical parts—

Figure 1 is a plan view of a mower to which is attached a side delivery rake, the cutter bar of the mower being shown in part. Figure 2 is an enlarged fragmentary view of the means utilized to operate the rake by power from the mower. Figure 3 is an enlarged horizontal detail section illustrating the gearing by which the rake is operated, and Figure 4 is a detail section on the line 4—4 of Figure 2.

In Figure 1 is illustrated a mower of a well known type having a frame 1, an axle 2 journaled on the frame, ground wheels 3 and 4 secured on the axle, and a cutter bar 5. Attached to the mower is a side delivery rake, of a well known type, sufficient of which is shown to illustrate its part in my invention in which the frame, comprises a rear bar 6, a front bar 7, and end bars 8 and 9. The bar 7 is bent to extend parallel with the grassward wheel 4 of the mower and is secured to one arm of a yoke $a$ to the opposite arm of which is fastened a bar $b$ which extends rearwardly and is secured to the bars 6 and 9. The parts composing the frame are rigidly bolted or riveted together.

The forward and grassward end of the frame is supported on the axle 2 by suitable bearings in which the axle 2 is rotatably journaled. The rear bar 6 and the end bar 8 are rigidly attached, at their rearward ends, to a bar 10 which extends forwardly and is secured to a sleeve 11 on the stubbleward end of the axle 2. The rear end of the bar 10 is supported by a caster wheel 12, and a similar wheel 13 is mounted on a bracket 14 secured to the frame bar 6. To add to the rigidity of the frame structure I utilize a bar 15 bolted or otherwise affixed to the bracket 14 and extended across the frame to the bar 10 to which it is bolted. As previously stated the forward end of the rake frame is supported on the axle 2 by bearings 16, only one of which is shown, which are bolted to the yoke $a$, at its connection with the bars 7 and $b$, and in which the grassward end of the axle rotates. This manner of connecting the mower and rake allowing a vertical flexibility to accommodate both machines to varying conditions of the ground surface and permitting adjustment of either machine independently of the other.

The rake shaft 17 carrying the reel, and the mechanism for operating the same, when the rake is used alone, is fully described in Letters Patent, No. 1,406,970, issued to me under date of February 21, 1922, and to which reference is made for the description thereof. In this instance, I operate the rake by power from the axle of the mower by a chain 18 over a sprocket 19 which is mounted on the axle 2, within the yoke a, and rotates therewith. The chain 18 leads over a similar sprocket 20 rigidly secured on a shaft 21 rotatably supported in a bearing 22 on the frame bar 6 and in a bearing 23 preferably integral with a bracket 24 on the frame bar 7. A bevel gear 25 is loosely mounted on the shaft 21 and meshes with the bevel gear 26 of the rake operating mechanism. As stated, the sprocket 19 is rigidly mounted on the axle 2 and the sprocket 20 is similarly secured on the shaft 21, consequently power is conveyed by the chain 18 to actuate the sprocket 20 and the shaft 21; now to cause operation of the rake I couple the bevel gear 25 to the sprocket 20 by a clutch of a common type, one part 27 of which slides upon the shaft 21, and is constantly connected with the bevel gear 25, the second part 28 of the clutch being preferably integral with the hub of the sprocket 20.

As shown in Figure 3 the parts of the clutch have been joined and power will be transmitted to actuate the rake. The clutch is controlled, or connected and disconnected, by a spanner 30 which engages with a groove in the part 27 of the clutch and is attached to a rod 31 slidably supported in a bearing 32 in the frame bar 7. A handle 33 is affixed to the rod 31 convenient to the seat 34 on the mower whereby the operator can readily slide the rod 31 and join or separate the parts of the clutch as may be desired, the parts being shown joined in Figures 1 and 3. I do not limit myself to the type of clutch shown nor to the specific form of the mechanism above described as they may be varied without departing from the spirit of my invention.

What I claim is:—

1. The combination with a mower having a frame, an axle and supporting wheels, of a rake positioned rearward of said frame and inclined horizontally in a rearward and stubbleward direction and supported on the mower axle outside the wheels, mechanism on the mower actuated by power from the grassward mower wheel cooperating with mechanism on the rake to actuate the latter to gather the swath precedent to the swath being cut and deposit it in a continuous windrow on ground previously raked.

2. The combination with a mower having a frame, an axle and supporting wheels, of a rake positioned rearward of said frame and inclined horizontally in a rearward and stubbleward direction and attached to the mower axle outside the wheels thereof and extending stubblewardly beyond the mower, said rake including a wheeled frame attached to the ends of the axle, gearing on said axle, gearing on the rake, and means connecting said gearing whereby power is conveyed from said mower to actuate the rake.

3. The combination with a mower, having a frame, an axle and supporting wheels, of a rake attached thereto and positioned rearward of the wheeled frame of the mower, said rake including a wheeled frame extending diagonally rearward and stubbleward, the grassward end of said frame formed substantially parallel to the plane of the adjacent mower wheel and supported on the mower axle outside of said wheel, and a support for the stubbleward end of said frame secured to the frame and on the mower axle outside of the stubbleward wheel thereon.

4. The combination with a mower, having a frame, an axle and supporting wheels, of a rake attached thereto positioned rearward of the wheeled frame of the mower, said rake including a wheeled frame extending diagonally rearward and stubbleward, the grassward end of said frame extending forwardly in substantial parallelism with the plane of the adjacent mower wheel and journaled on the mower axle outside of said wheel, a support for the stubbleward end of said frame secured to the frame and on the mower axle outside the stubbleward wheel, and a train of gearing supported on the grassward end of said rake frame and means connecting said gearing with the mower axle and operating to actuate said rake by power from the mower.

ROBERT R. BOWERS.